United States Patent [19]

Albright

[11] Patent Number: 4,956,579

[45] Date of Patent: Sep. 11, 1990

[54] PLASMA DISPLAY USING A DOUBLE-WALLED ENCLOSURE

[76] Inventor: Larry W. Albright, 419 Sunset Ave., Venice, Calif. 90291

[21] Appl. No.: 258,200

[22] Filed: Oct. 14, 1988

[51] Int. Cl.⁵ .............................................. H05B 37/00
[52] U.S. Cl. ..................................... 315/58; 315/248; 315/326; 313/608
[58] Field of Search ...................... 315/58, 248, 326; 313/25, 313, 608, 631, 634

[56] References Cited

U.S. PATENT DOCUMENTS 4,379,253  4/1983  Myer ................................. 315/289
4,754,199  6/1988  Parker ............................... 315/85

Primary Examiner—Robert J. Pascal
Attorney, Agent, or Firm—Spensley, Horn, Jubas & Lubitz

[57] ABSTRACT

A gas containing envelope in the form of a double walled cylinder is closed at one end and open at its other end, with the double walls of the cylinder defining an enclosed gas discharge area. The double walls of the cylinder are made of a transparent dielectric material such as glass. The gas discharge area formed between the double walls is filled with an ionizable gas, and an electrode is disposed adjacent to or within the gas discharge area between the cylinder walls at the closed end of the envelope cylinder. A ground potential reference point is provided outside the double walled cylinder, and a power supply is provided to couple an a.c. electrical signal between the electrode and the ground potential reference point for producing visible electrical discharges in said gas discharge area.

19 Claims, 1 Drawing Sheet

PLASMA DISPLAY USING A DOUBLE-WALLED ENCLOSURE

BACKGROUND OF THE INVENTION

The present invention relates to a plasma or gas discharge display for displaying light phenomena, and in particular relates to an improved enclosure or envelope for containing the display, and other improved features relating to the power supply for such a display device.

Lamps and lighting arrangements which utilize discharges in gas filled vessels have, of course, been known for a long time. Nikoli Tesla performed experiments in the early 1900's with the application of high voltage, high frequency signals to produce discharges in gases. And of course, neon signs and fluorescent lights are two common examples of applications of electrically generated gaseous discharges.

One particularly interesting aspect of electrically induced gaseous discharges has been in the area of utilizing such discharges as an art form. In particular, there have been various devices on the market and shown at shows which utilize a transparent globe or sphere enclosing an ionizable gas mixture. High voltage, high frequency signals are applied to the globe through one or more electrodes to induce visually interesting electrical discharges in the gas contained within the globe or sphere towards an external ground. Such globes are made of a transparent dielectric material, such as glass, and the globes can function to capacitively couple a conductor on the outside of the globe, such as a human hand, to the "conductive" gas on the inside of the globe or sphere. Thus, as an art form, placing one's hand in contact with or adjacent to a globe or sphere influences and affects the discharge taking place within the sphere, leading to interesting visual effects and control over those effects.

Prior art patents exist on gas discharge or plasma spheres as art forms, including U.S. Pat. Nos. 4,379,253 and 4,754,199. Concerns attendant to any such sphere construction are safely coupling as much power as possible into the sphere, so as to produce a more intense visible display, and producing as interesting a visual pattern as possible.

OBJECTS AND SUMMARY OF THE INVENTION

It is an object of the present invention to provide a plasma display utilizing a double-walled enclosure instead of a sphere, which has unexpectedly been found to produce more intense and visually interesting electrical discharges than the prior art spheres.

It is another object of this invention to provide a plasma display in a double-walled enclosure utilizing an improved power supply for producing interesting and intense visual discharge displays.

Briefly, in accordance with one embodiment of the invention, there is provided a gas containing envelope in the form of a double walled cylinder closed at one end and open at its other end, with the double walls of the cylinder defining an enclosed gas discharge area. The double walls of the cylinder are made of a transparent dielectric material such as glass. The gas discharge area formed between the double walls is filled with an ionizable gas, and an electrode is disposed adjacent to or within the gas discharge area between the cylinder walls at the closed end of the envelope cylinder. A ground potential reference point is provided outside the double walled cylinder, and a power supply is provided to couple an a.c. electrical signal between the electrode and the ground potential reference point for producing visible electrical discharges in said gas discharge area.

Other objects and advantages of the invention will appear from the following detailed description taken in conjunction with the accompanying drawings.

DETAILED DESCRIPTION

Figure 1:
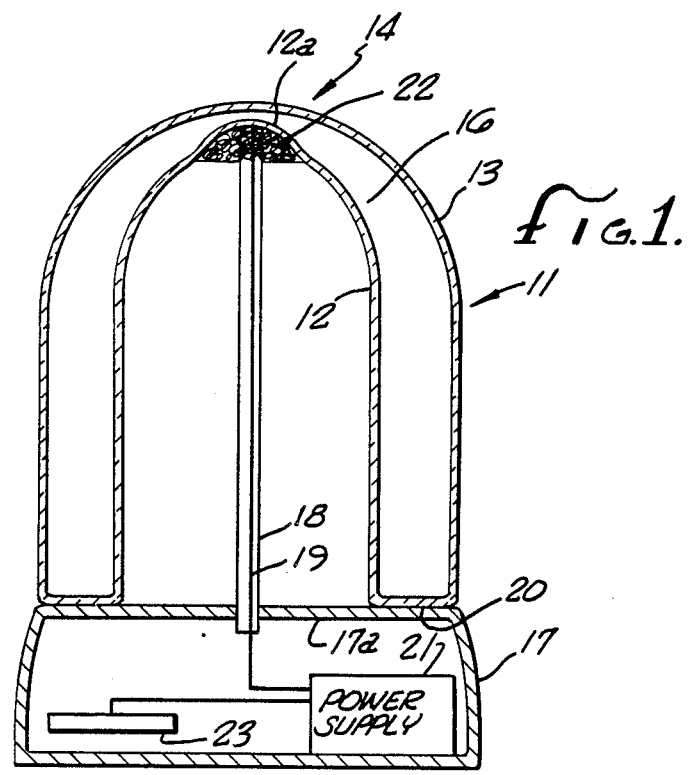
FIG. 1 is a cross sectional view of the double-walled enclosure for a plasma display in accordance with an embodiment of the invention, indicating a base also in cross section and diagrammatically indicated the presence of a ground potential and power supply within the base.

Turning now to the drawings, FIG. 1 illustrates a cross sectional view of the double-walled cylindrical enclosure for a plasma display in accordance with the invention. FIG. 1 also shows in cross section a suitable base for the double-walled enclosure, and illustrates in diagrammatic form the presence of a power supply and ground potential. In particular, the double-walled enclosure generally indicated at 11 is in the form of a cylinder having inner wall 12 and outer wall 13. The double-walled cylinder thus formed is closed at its end generally indicated by reference numeral 14, and is open at its other end, forming essentially a Dewar shaped configuration.

The double-walled enclosure 11 is made of a suitable transparent dielectric material, such as glass. The volume 16 defined by the inner wall 12 and outer wall 13 constitutes the gas discharge area. The inner and outer walls can be of any suitable thickness necessary to withstand the pressure resulting from filling the gas discharge chamber with gas at less than atmospheric pressure.

The gas discharge area 16 is filled with a suitable ionizable gas, as known to those skilled in the art of gas discharge displays. Various gas mixtures can be used, depending upon the color and behavior of discharge desired. Usually, the exact gas mixture is determined based on empirical experiments using various gas mixtures to achieve whatever visual effect is desired. The gases which are utilized in the gas mixture are various of the noble, inert gases, such as krypton, neon, xenon and the like, which ionize under the influence of a high potential electrical field and provide an interesting visual discharge. Typically, the gas mixture is at a pressure ranging from atmospheric down to one/quarter atmospheric pressure.

In FIG. 1, the double-walled enclosure 11 is shown as supported by a suitable base member 17. The base member can really be of any configuration in accordance with the invention and made of virtually any material. Various means can be utilized for attaching and supporting the double walled enclosure 11 by the base member, including clamps, retaining rings and the like. One suitable means is through use of an adhesive placed at the interface 18 between the double-walled enclosure and base. A suitable adhesive is silicone rubber, which bonds well to materials such as glass.

A plate portion 17a of the base member has a centrally located support column 18 extending upwardly from the plate portion 17a as shown in FIG. 1. This support column can be mounted in any suitable manner, including adhesives, screw threads, clamps and the like. The support column 18 forms a conduit for a conductor 19 which connects a power supply 21 to an electrode 22. The electrode 22 couples a high voltage, oscillating electrical field generated by the power supply into the gas mixture 16. As known in the art, such an electrode can either extend through the wall of the enclosure 11, or can be on the outer surface of the wall, in this case the inner wall 12. The electrode itself can also be in many forms. For example, there is illustrated in FIG. 1 one form of electrode 22 which has proved advantageous, which is in the form of a mass of conductors, i.e. a stainless steel wool configuration. This form of electrode has the advantage of insuring many contact points with the inner wall 12 of the double-walled enclosure 11. Alternate forms of electrode are of course possible, including, as another example, a layer of colloidal graphite deposited on the outside of the inner wall 12 of the double-walled enclosure.

As shown in FIG. 1, the electrode 22 is in contact with the inner wall of the double-walled enclosure at the closed end of the cylinder. In the embodiment illustrated in FIG. 1, a dimple 12a is shown formed in the inner wall 12 for receiving electrode 22. It has been found that providing the dimple, in addition to providing for the electrode 22, has a beneficial effect in shaping the electrical discharges that occur in the gas mixture 16 originating from the vicinity of the electrode 22. It has also been found that the most visually interesting discharges occur in the gas mixture 16 when the spacing between the inner wall 12 and outer wall 13 is on the order of three/quarters of an inch, or at least between one/half inch and one inch.

As shown in FIG. 1, a ground potential 23 is provided to which the power supply 21 is connected, to provide the electrical field within the gas mixture 16 established by the electrode 22. This ground potential can be established in various ways, i.e. by providing a separate ground plane or utilizing part of the base 17 as a ground plane.

Figure 2:
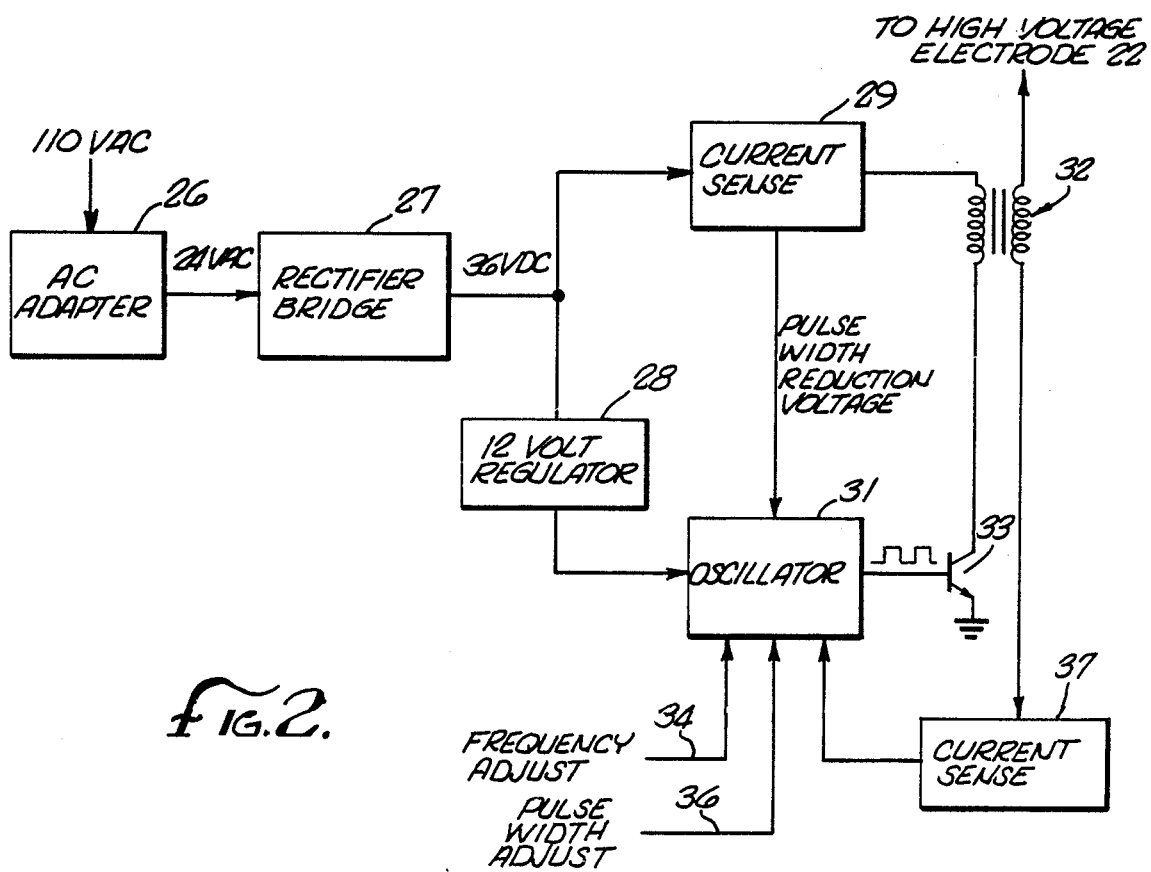
FIG. 2 is a schematic block diagram of a suitable power supply for the plasma display of FIG. 1.

Turning now to FIG. 2, there is illustrated a block diagram of a suitable power supply circuit for the power supply 21 of FIG. 1. In this particular embodiment, an ac adapter 26 converts 110 volts a.c. to 24 volts a.c. A rectifier bridge 27 converts the 24 volts a.c. to 36 volts d.c., with the 36 volts d.c. being applied to both a 12 volt regulator 28 and a current sense circuit 29. The 12 volt regulator supplies power to an oscillator 31, which is a square wave oscillator adjustable for frequency and pulse width, which drives a flyback transformer 32 on and off several thousand times a second through a transistor 33. Inputs 34 and 36 to oscillator 31 provide respectively adjustments for frequency and pulse width of the oscillator output. In accordance with a particular embodiment, the frequency is adjustable between 6 KHz and 16 KHz, and the pulse width adjustable between close to zero and 10 microseconds. If desired, frequency and pulse width adjustment means (not shown) can be provided on the base 17 of the unit in FIG. 1.

In the power supply of FIG. 2, the high voltage secondary of transformer 32 is for connection to the high voltage electrode 22 shown in FIG. 1, and the emitter of transistor 33 is coupled to the ground potential means 23 of FIG. 1.

A current sense circuit 37 is provided connected in the high voltage side of transformer 32, which senses total current in the high voltage side. If this current exceeds a threshold level, as might be encountered if the double-walled enclosure were broken leaving the high voltage lead 22 exposed, a latch is tripped and an inhibit command is sent to the oscillator 31. The oscillator then stops, which effectively prevents the continuation of production of high voltage from transformer 32. When power is switched off and then on again (via a.c. adapter 26) the oscillator is reset to run again.

The current sense circuit 29 similarly serves a safety function. The current sense circuit 29 senses levels of current in the primary winding of transformer 32 approaching overload, and derives a control voltage which automatically reduces the pulse width output of oscillator 31. This has the effect of preventing the overall gas discharge device from exceeding its power dissipation limits.

While a particular embodiment of a power supply is illustrated in FIG. 2, the invention is of course not limited to use of that particular power supplies exist and/or are within the skill of those working in this art.

Although the invention has been illustrated and described with respect to a presently preferred embodiment thereof, it should be clear that various changes, substitutions and modifications are possible to the specific illustrated embodiment by those skilled in the art without departing from the true spirit and scope of the invention.

I claim:

1. A gas discharge display device comprising:
   a gas containing envelope in the form of a double walled cylinder closed at one end and open at its other end, with the double walls of the cylinder defining an enclosed gas discharge area, said double walls being of a transparent dielectric material, the gas discharge area formed by the double walls being filled with an ionizable gas,
   an electrode disposed adjacent to or within the gas discharge area between the cylinder walls at the closed end of the envelope cylinder,
   a ground potential reference point outside the double walled cylinder, and
   a power supply for coupling an a.c. electrical signal between said electrode and the ground potential reference point for producing visible electrical discharges in said gas discharge area,
   wherein the double walls of the cylinder are spaced between one-fourth of an inch and an inch apart.

2. A gas discharge display device in accordance with claim 1 wherein the inner of the double walls of the double walled cylinder at its closed end is dimpled inwardly towards the outer wall, and wherein said electrode is positioned in the dimpled area of the inner wall.

3. A gas discharge display device in accordance with claim 2 wherein said electrode comprises a conductive mesh disposed within the dimpled portion of the inner wall at the closed end of the cylinder.

4. A gas discharge display device in accordance with claim 1 wherein said electrode comprises a conductive mesh disposed adjacent the inner wall at the closed end of the cylinder.

5. A gas discharge display device comprising:
   a gas containing envelope in the form of a double walled container closed at one end and open at its other end, with the double walls of the container defining an enclosed gas discharge area, said double walls comprising a transparent dielectric material, the gas discharge area formed by the double walls being filled with an ionizable gas,
an electrode disposed in electrical communication with the gas discharge area,
a ground potential reference point outside the double walled container, and
a power supply for coupling an a.c. electrical signal between said electrode and the ground potential reference point for producing visible electrical discharges in said gas discharge area,
wherein the double walls of the container are spaced between one-fourth of an inch and an inch apart.

6. A gas discharge display device in accordance with claim 5 wherein he inner of the double walls of the double walled container at its closed end is dimpled inwardly towards the outer wall, and wherein said electrode is positioned in the dimpled area of the inner wall.

7. A gas discharge display device in accordance with claim 6 wherein said electrode comprises a conductive mesh disposed within the dimpled portion of the inner wall at the closed end of the container.

8. A gas discharge display device comprising:
a gas containing envelope defining an enclosed gas discharge area, the gas discharge area being filled with an ionizable gas;
an electrode disposed in electrical communication with the gas discharge area;
a ground potential reference point;
a power supply for coupling an electrical signal between said electrode and the ground potential reference point for producing visible electrical discharges in said gas discharge area, said power supply comprising:
a power source;
a transformer having a first winding electrically connected to said power source and having a second winding electrically connected to said electrode, said transformer for providing a voltage signal at said second winding;
a current sensor connected to sense a level of current in said second winding, said current sensor having means for comparing a sensed current level with a reference level and means for preventing said transformer from providing said voltage signal at said second winding upon said sensed current level exceeding said reference level.

9. A device as claimed in claim 8, wherein said first winding is a primary winding of said transformer and said second winding is a secondary winding of said transformer.

10. A device as claimed in claim 9, wherein said power supply further comprises:
means for supplying current to said primary winding;
means for controlling the supply of current to said primary winding according to a cyclical signal, wherein current is supplied to said primary winding during a first portion of each cycle of said cyclical signal and current is substantially prevented from being supplied to said primary winding during a second portion of each cycle of said cyclical signal;
a current sensor connected to sense a level of current in said primary winding, said current sensor including means for comparing a sensed current level with a reference level and means for adjusting the signal width of at least one of said first and second portions of said cyclical signal upon said sensed current level exceeding said reference level.

11. A device as claimed in claim 9, wherein said power supply further comprises:
means for supplying current to said primary winding;
means for controlling the supply of current to said primary winding according to a cyclical signal, wherein current is supplied to said primary winding during a first portion of each cycle of said cyclical signal and current is substantially prevented from being supplied to said primary winding during a second portion of each cycle of said cyclical signal;
a current sensor connected to sense a level of current in said primary winding, said current sensor including means for comparing a sensed current level with a reference level and means for reducing the signal width of said first portion of said cyclical signal upon said sensed current level exceeding said reference level.

12. A gas discharge display device comprising:
a gas containing envelope having a first wall portion and a second wall portion spaced between one-fourth of an inch and an inch apart and defining a gas discharge area therebetween, the gas discharge area containing an ionizable gas,
an electrode in electrical communication with the gas discharge area,
a ground potential reference point outside the gas discharge area, and
a power supply for coupling an electrical signal between said electrode and the ground potential reference point for producing visible electrical discharges in said gas discharge area.

13. A gas discharge display device in accordance with claim 12 wherein said electrode comprises a conductive mesh disposed adjacent at least one of said first and second wall portions.

14. A gas discharge display device in accordance with claim 12 wherein at least one of said first and second wall portions is dimpled inwardly towards the other wall portion, and wherein said electrode is positioned in the dimpled area of the dimpled wall portion.

15. A gas discharge display device in accordance with claim 14 wherein said electrode comprises a conductive mesh disposed within the dimpled wall portion.

16. A gas discharge display device comprising:
a double walled container defining a gas discharge area containing an iodizable gas, the double walls of the container being spaced between substantially one-fourth of an inch and an inch apart,
an electrode disposed in electrical communication with the gas discharge area,
a ground potential, and
a power supply electrically connected to provide an electrical signal between said electrode and said ground potential for producing electrical discharges in said gas discharge area.

17. A gas discharge display device in accordance with claim 16 wherein said electrode comprises a conductive mesh disposed adjacent at least one wall of said double walls.

18. A gas discharge device in accordance with claim 16 wherein at least one wall of said double walls is dimpled inwardly towards the other wall, and wherein said electrode is positioned in the dimpled area of said dimpled wall.

19. A gas discharge display device in accordance with claim 18 wherein said electrode comprises a conductive mesh disposed within said dimpled area of said dimpled wall.

* * * * *